(No Model.)
W. H. SEWELL.
VEHICLE TIRE.
No. 598,443.　　　　　　　　　　Patented Feb. 1, 1898.
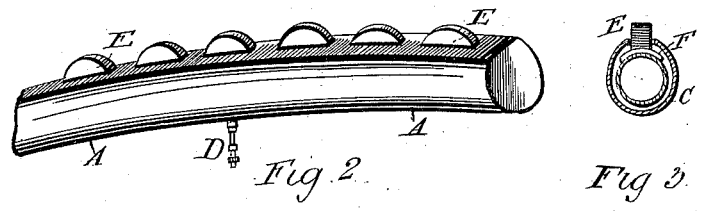
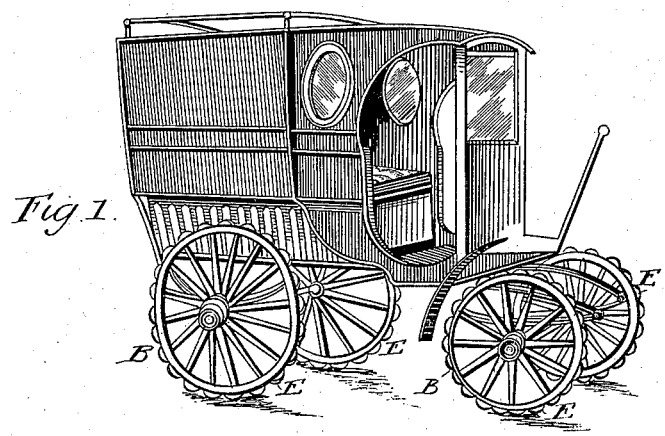
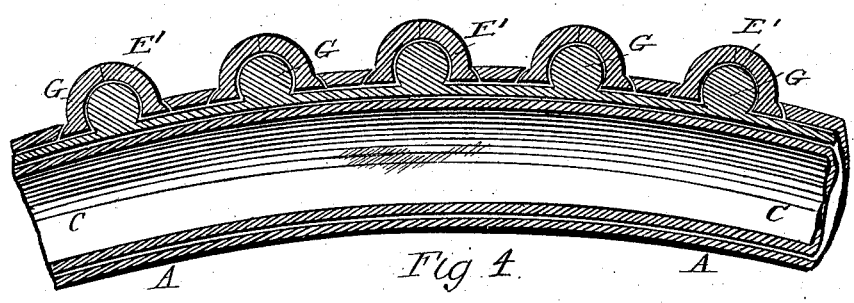
Witnesses:
Fred R. Proctor
Herbert Bradley
Inventor.
William Herbert Sewell
By Knight Bros
Atty's.

United States Patent Office.

WILLIAM HERBERT SEWELL, OF COLERAINE, IRELAND.

VEHICLE-TIRE.

SPECIFICATION forming part of Letters Patent No. 598,443, dated February 1, 1898.

Application filed December 11, 1896. Serial No. 615,372. (No model.) Patented in England September 23, 1895, No. 17,691.

*To all whom it may concern:*

Be it known that I, WILLIAM HERBERT SEWELL, produce merchant, of Diamond, Coleraine, in the county of Londonderry, Ireland, have invented Improvements in Tires for the Wheels of Cycles, Omnibuses, Wagons, Railway-Carriages, and other Vehicles, (for which I have obtained a patent in Great Britain, No. 17,691, dated September 23, 1895,) of which the following is a specification.

This invention relates to improvements in the tires of cycles, omnibuses, wagons, railway-carriages, and other vehicles.

My invention consists of a hollow perforated rim or felly which incloses and so protects a pneumatic tube or series of chambers fitted with an inflating and deflating air valve or valves. The wheel is run on a series of sections or segments projecting through the perforations of the rim and which are each attached to or supported by a flange bearing on the inside of the outside or ground face of rim, but free to work up into or against the pneumatic tube or chamber within the rim. These sections or segments are easily placed in position while the air tube or chamber is in a flaccid state or before inflation, but they are irremovably fixed after the inflation of the tube or chamber. These sections or segments may be designated the "shoeing" and may be either solid or hollow and may be composed of various substances—such as metal, india-rubber, gutta-percha, wood, whalebone, or other suitable material or combination of materials, according to the amount of wear or durability desired—and they may also be in various shapes—such as circles, half-circles, sections of circles, cycloids, spheres, or part spheres, flat, square, oval, oblong, or other convenient shape. They may also be spaced or placed apart, so as to reduce ground contact or friction, but at such distances as will not interfere with the harmony or continuity of revolution of the wheel.

In order that my invention may be properly understood and readily carried into effect, I have hereunto appended one sheet of drawings, showing my improvements applied to one form of vehicle, on the several figures of which corresponding parts are marked with similar letters of reference.

Figure 1 is a general view of vehicle, showing my improvements applied thereto. Fig. 2 is a part side elevation of rim. Fig. 3 is a transverse section of Fig. 2. Fig. 4 is a modification.

A is the hollow perforated rim or felly of the wheel B, C the pneumatic tube or chamber, and D the valve, which projects through the wall of the rim to retain the tube *in situ*.

E are the sections or segments projecting through the perforations of the rim and which are provided with flanges F to keep them in their proper position after the tire has been inflated.

Although I have shown the pneumatic tube in one continuous piece, it may be in sections, which would facilitate the replacing of a shoe or segment which may have become damaged or worn. In such case each pneumatic section might be provided with a separate valve.

In Fig. 4 E' is the shoe or knob, of metal or other material. G is a solid rubber band, with projections to fit the cavity in the shoes or knobs. C' is the pneumatic tube, and A the hollow rim or felly of the wheel.

Having now particularly described and ascertained the nature of my said invention and in what manner the same is to be performed, I declare that what I claim is—

A vehicle-tire comprising a pneumatic tube, a hollow perforated rim or felly inclosing the pneumatic tube, and sections or segments provided with flanges and projecting through the perforations in the rim or felly; substantially as described.

In testimony whereof I have signed my name to this specification in the presence of two witnesses:

WILLIAM HERBERT SEWELL.

Witnesses:
JOHN LIDDLE,
JOSEPH HENRY PEARSON.